United States Patent
Saito et al.

(10) Patent No.: US 12,489,743 B2
(45) Date of Patent: *Dec. 2, 2025

(54) AVATAR MANAGEMENT SYSTEM, AVATAR MANAGEMENT METHOD, PROGRAM, AND COMPUTER-READABLE RECORDING MEDIUM

(71) Applicant: TOPPAN INC., Tokyo (JP)

(72) Inventors: Ryusuke Saito, Tokyo (JP); Chihiro Kaneyama, Tokyo (JP); Yuko Koike, Tokyo (JP)

(73) Assignee: TOPPAN INC., Tokyo (JP)

( * ) Notice: Subject to any disclaimer, the term of this patent is extended or adjusted under 35 U.S.C. 154(b) by 121 days.

This patent is subject to a terminal disclaimer.

(21) Appl. No.: 18/383,032

(22) Filed: Oct. 23, 2023

(65) Prior Publication Data
US 2024/0056436 A1  Feb. 15, 2024

Related U.S. Application Data

(63) Continuation of application No. 17/994,928, filed on Nov. 28, 2022, now Pat. No. 11,831,637, which is a
(Continued)

(30) Foreign Application Priority Data

Oct. 29, 2021  (JP) .................... 2021-178128

(51) Int. Cl.
*H04L 9/40* (2022.01)
*H04L 9/32* (2006.01)

(52) U.S. Cl.
CPC ............ *H04L 63/0823* (2013.01); *H04L 9/32* (2013.01); *H04L 9/3263* (2013.01); *H04L 9/3268* (2013.01)

(58) Field of Classification Search
CPC ...... H04L 63/0823; H04L 9/32; H04L 9/3263; H04L 9/3268; H04L 9/50; H04L 63/08; G06F 21/16; G06F 21/31; G06F 21/33
See application file for complete search history.

(56) References Cited

U.S. PATENT DOCUMENTS

| | | | |
|---|---|---|---|
| 2010/0153722 A1* | 6/2010 | Bauchot | H04L 9/3263 |
| | | | 713/168 |
| 2010/0229235 A1 | 9/2010 | Dawson et al. | |

(Continued)

FOREIGN PATENT DOCUMENTS

| | | |
|---|---|---|
| EP | 3 498 351 A1 | 6/2019 |
| JP | 2003-067474 A | 3/2003 |

(Continued)

OTHER PUBLICATIONS

"Continuous Authentication for Secure and Seamless User-Avatar Integration in Multi-Device Metaverses"—Hwang et al, Journal of Latex Class Files, vol. 14, No. 8, 08/2021chrome-extension://efaidnbmnnnibpcajpcglclefindmkaj/https://arxiv.org/pdf/2209.08893 (Year: 2022).*

(Continued)

*Primary Examiner* — Randy A Scott
(74) *Attorney, Agent, or Firm* — Foley & Lardner LLP

(57) ABSTRACT

An avatar management system includes an avatar registration unit configured to register an available avatar by having a storage unit to store the avatar available in a network service provided to an end user on a network, an authentication information assignment unit configured to assign authentication information to a registration target avatar registered in the avatar registration unit, and an authenticity confirmation unit configured to confirm authenticity of a designated avatar based on an assignment condition of the authentication information to the designated avatar, in accor- (Continued)

dance with an authenticity confirmation inquiry made by designating the avatar used in the network service.

16 Claims, 8 Drawing Sheets

Related U.S. Application Data continuation of application No. PCT/JP2022/018598, filed on Apr. 22, 2022.

(56) References Cited

U.S. PATENT DOCUMENTS

| | | |
|---|---|---|
| 2011/0231434 A1 | 9/2011 | Tabata et al. |
| 2013/0047208 A1 | 2/2013 | Shuster et al. |
| 2013/0283055 A1 | 10/2013 | Dettinger et al. |
| 2015/0379623 A1 | 12/2015 | Gadre et al. |

FOREIGN PATENT DOCUMENTS

| | | | |
|---|---|---|---|
| JP | 2021-015429 A | 2/2021 | |
| JP | 2021-152919 A | 9/2021 | |
| JP | 2021-163187 A | 10/2021 | |
| KR | 100812314 B1 | 3/2008 | |
| KR | 10-2008-0033917 A | 4/2008 | |
| WO | WO-2016131083 A1 * | 8/2016 | |
| WO | WO-2023017580 A1 * | 2/2023 | ............. G06F 21/64 |

OTHER PUBLICATIONS

"Roblox Responds to the Hack That Allowed a Child's Avatar to be R**** in its Game"—Sarah Perez, Tech Crunch, Jul. 18, 2018 https://techcrunch.com/2018/07/18/roblox-responds-to-the-hack-that-allowed-a-childs-avatar-to-be-raped-in-its-game/ (Year: 2018).*

European Extended Search Report issued in corresponding European Patent Application No. 22886359.3 dated Nov. 20, 2024.

Wang et al., "A Survey on Metaverse: Fundamentals, Security, and Privacy," ARXIV—Vanity, Mar. 2022, retrieved from https://arxiv.org/abs/2203.02662v1.

Perez, Sarah, "Roblox responds to the hack that allowed a child's avatar to be raped in its game," Tech Crunch, Jul. 18, 2018, retrieved from https://techcrunch.com/2018/07/18.

International Searching Authority, "International Search Report," issued in connection with International Patent Application No. PCT/JP2022/018598, dated Jul. 19, 2022.

International Searching Authority, "Written Opinion," issued in connection with International Patent Application No. PCT/JP2022/018598, dated Jul. 19, 2022.

* cited by examiner

FIG. 11

| AVATAR ID |
|---|
| AUTHORIZED USER INFORMATION |
| AVATAR FORMAT |
| CORRESPONDING METAVERSE FORMAT |
| USE DESTINATION DESIGNATION INFORMATION |
| ⋮ |

# AVATAR MANAGEMENT SYSTEM, AVATAR MANAGEMENT METHOD, PROGRAM, AND COMPUTER- READABLE RECORDING MEDIUM

CROSS-REFERENCE TO RELATED APPLICATIONS

The present application is a Continuation of U.S. patent application Ser. No. 17/994,928, filed on Nov. 28, 2022, which is a Bypass Continuation of International Patent Application No. PCT/JP2022/018598, filed Apr. 22, 2022, which claims priority to and the benefit of Japanese Patent Application No. 2021-178128, filed on Oct. 29, 2021. The contents of these applications are hereby incorporated by reference in their entireties.

TECHNICAL FIELD

The present invention relates to an avatar management system, an avatar management method, a program, and a computer-readable recording medium.

DESCRIPTION OF RELATED ART

Technology for generating a real avatar having a face significantly similar to that of a user with photo data of the user and utilizing the generated real avatar for a chat is known (for example, see Japanese Unexamined Patent Application, First Publication No. 2021-152919).

SUMMARY OF INVENTION

Areal avatar like that described above is likely to be treated as personal information since the actual person who is a generation source, can be easily identified from the real avatar. With this as a background, it is desirable to determine the authenticity of avatars for use in various types of services on a network.

The present invention is made in view of such circumstances and enables the determination of the authenticity of avatars for use in various types of services on a network.

According to an aspect of the present invention for solving the above problem, an avatar management system that includes: an avatar registration unit configured to register an available avatar by having a storage unit to store the avatar available in a network service provided to an end user on a network; an authentication information assignment unit configured to assign authentication information to the registration target avatar registered in the avatar registration unit; and an authenticity confirmation unit configured to confirm authenticity of a designated avatar based on an assignment condition of the authentication information to the designated avatar, in accordance with an authenticity confirmation inquiry, made by designating the avatar used in the network service is provided.

Also, according, to an aspect of the present invention, an avatar management method for use in an avatar management system, where the avatar management method includes: an avatar registration step of registering an available avatar by having a storage unit to store, the avatar available in a network service provided to an end user on a network; an authentication information assignment step of assigning authentication information to the registration target avatar in the avatar registration step; and an authenticity confirmation step of confirming authenticity of a designated avatar based on, an assignment condition of the authentication information to the designated avatar, in accordance with an, authenticity confirmation inquiry made by designating the avatar used in the network service is provided.

Also, according to an aspect of the present invention, a program for'having a computer in an avatar management device to function as: an avatar registration unit configured to register an, available avatar by having a storage unit store the avatar available in a network service provided to an end user on a network; an authentication information assignment unit configured to assign authentication information to the registration target avatar in the avatar registration unit; and an authenticity confirmation unit configured to confirm authenticity of a designated avatar based on an assignment condition of the authentication information to the designated avatar, in accordance with an authenticity confirmation inquiry made by designating the avatar used in the network service is provided.

Also, according to an aspect of the present invention, a computer-readable non-transitory recording medium including a program for having a computer in an avatar management device to function as: an avatar registration unit configured to register an available avatar by having a storage unit to store the avatar available in a network service provided to an end user on a network; an authentication information assignment unit configured to assign authentication information to the registration target avatar in the avatar registration unit; and an authenticity confirmation unit configured to confirm authenticity of a designated avatar based on an assignment condition of the authentication information to the designated avatar, in accordance with an authenticity confirmation inquiry made by designating the avatar used in the network service is provided.

As described above, the present invention enables the determination of the authenticity of avatars for use in various types of services on a network.

BRIEF DESCRIPTION OF THE DRAWINGS

FIG. 11 is a diagram showing, an example of a data catalog according to the present embodiment.

DETAILED DESCRIPTION OF THE PREFERRED EMBODIMENTS

First Embodiment

Figure 1:
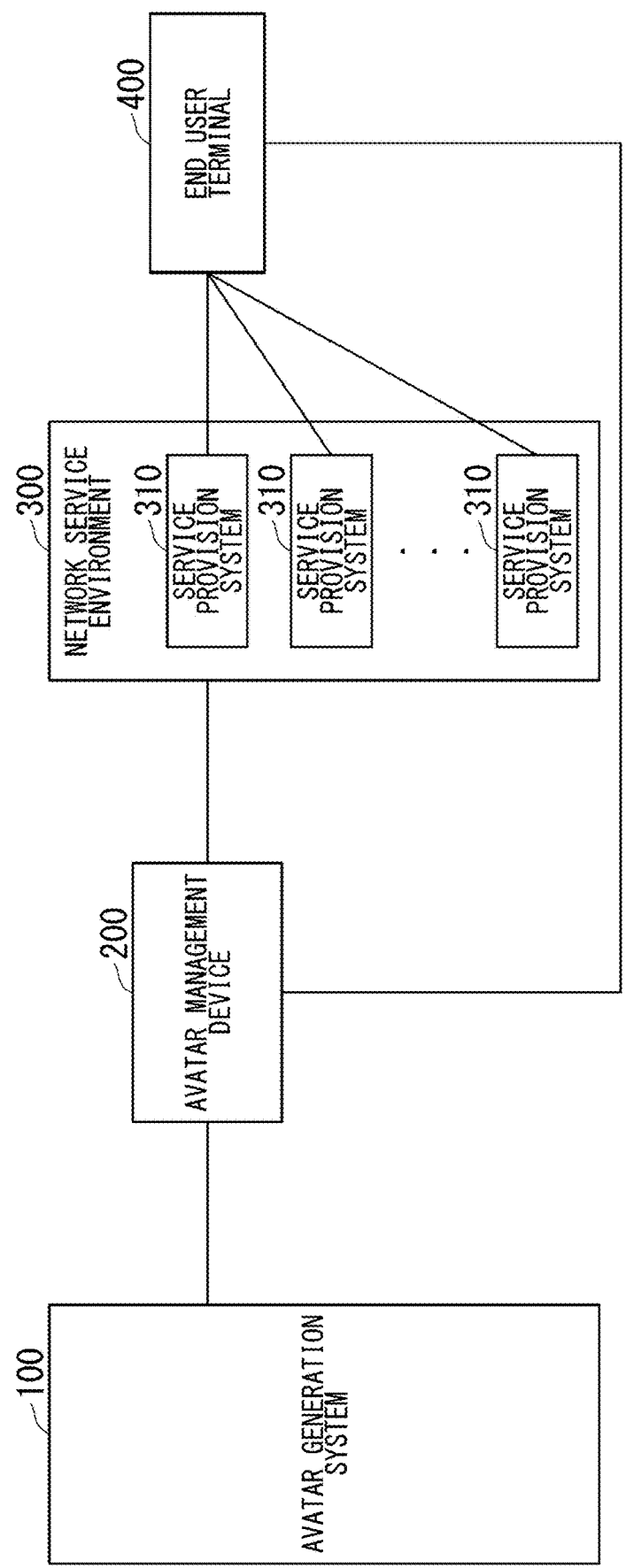
FIG. 1 is a diagram showing, an example of a configuration of an avatar management system according to the present embodiment.

FIG. 1 shows an example of an overall configuration of an avatar management system of the present embodiment. The avatar management system of the present embodiment includes an avatar generation system 100, an avatar management device 200, a network service environment 300, and an end user terminal 400.

The avatar generation system 100 is a system that generates avatars for use in the network service environment 300.

Figure 2:
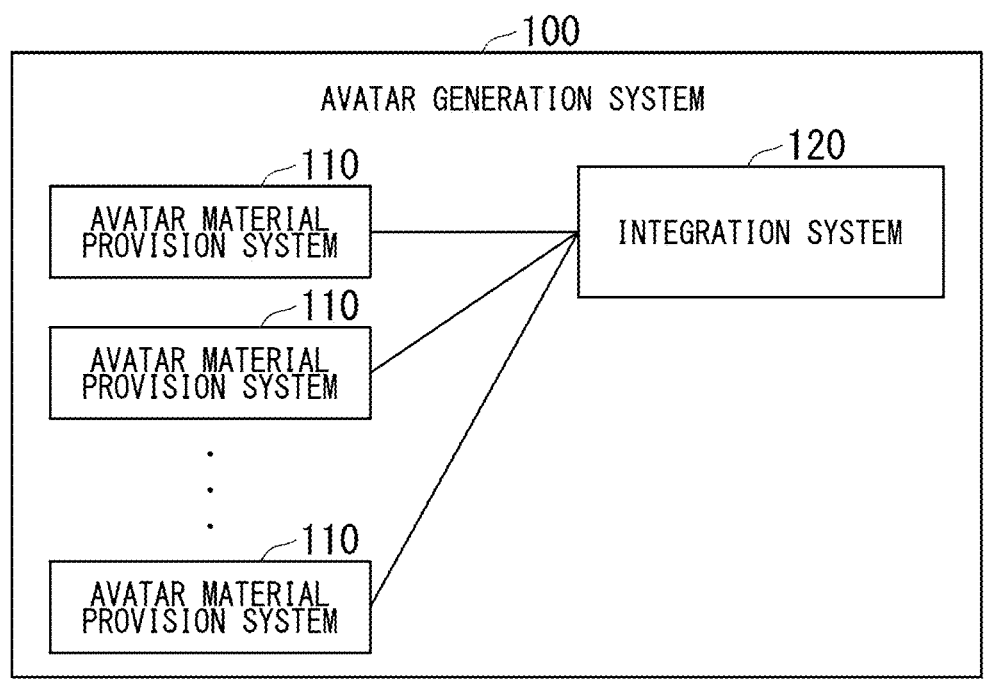
FIG. 2 is a diagram showing an example of a configuration of the avatar management system according to the present embodiment.

FIG. 2 shows an example of a configuration of the avatar generation system 100. The avatar generation system 100 shown in FIG. 2 includes a plurality of avatar material provision systems 110 and one integration system 120.

The avatar material provision system 110 is a system that generates prescribed avatar materials among materials constituting the avatar (avatar materials) and provides the generated avatar materials. The avatar material provision system 110 may be operated by, for example, a prescribed avatar material provider (company).

The integration system 120 acquires necessary avatar materials from among the avatar materials provided by the avatar material provision system 110 and generates an avatar by integrating (combining) the acquired avatar materials.

In the avatar generation system 100, the avatar material provision system 110 and the integration system 120 may be connected via a network.

Also, it is only necessary for the number of avatar material provision systems 110 in the avatar generation system 100 to be one or more and the number of avatar material provision systems 110 is not particularly limited. Also, it is only necessary for the number of integration systems 120 to be one or more and the number of integration systems 120 is not particularly limited.

Figure 3:
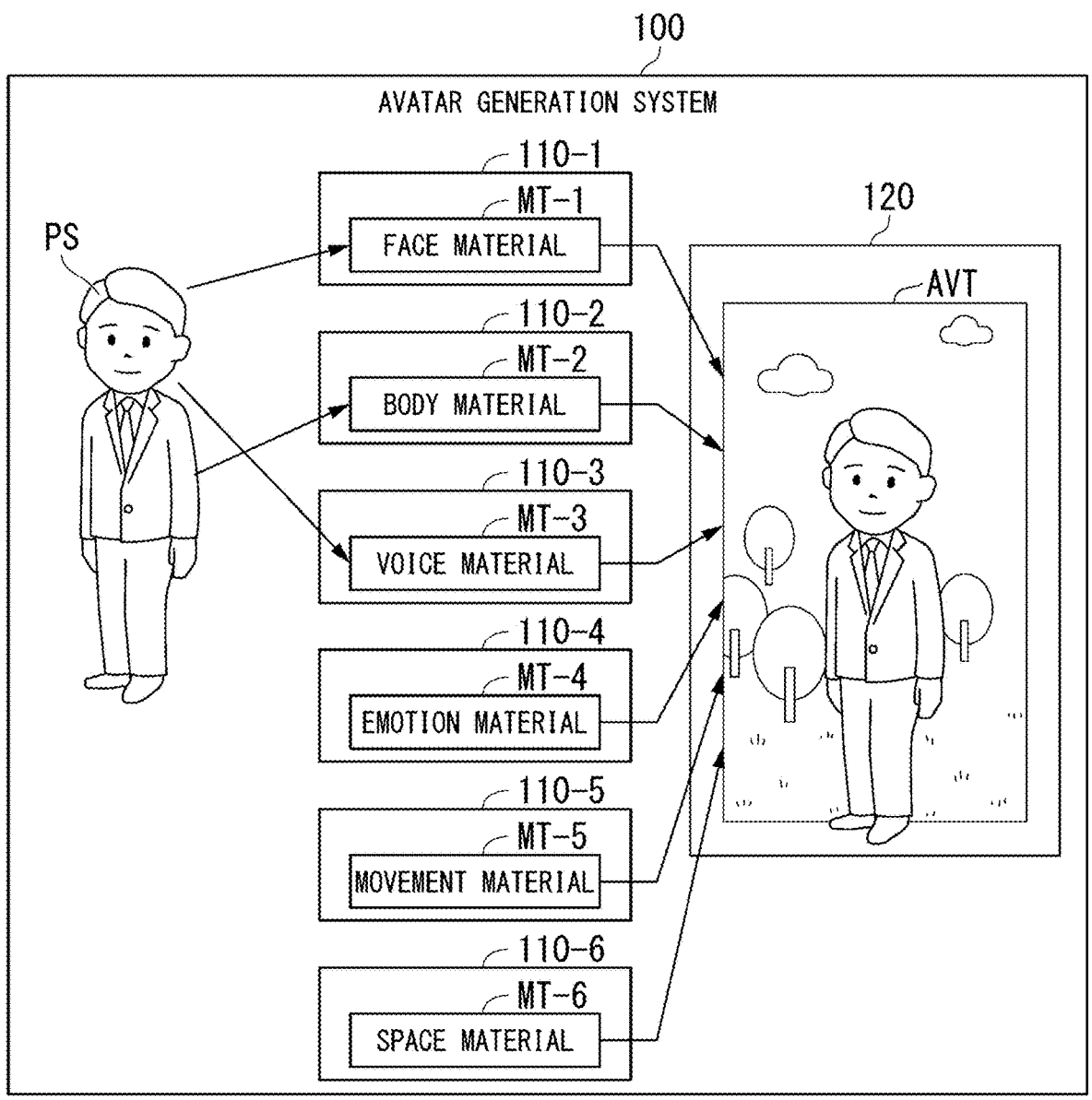
FIG. 3 is a diagram schematically showing a flow of avatar generation in an avatar generation system according to the present embodiment.

FIG. 3 schematically shows a flow of avatar generation in the avatar generation system 100. In the description of FIG. 3, a case where a three-dimensional (3D) real avatar depicted as a person is generated is described as an example. A real avatar, for example, is an avatar obtained by realistically reproducing the appearance of an actual, person PS based on information obtained by capturing an image of the person PS who is a generation source.

In the avatar generation system 100 of FIG. 3, an example in which six avatar material provision systems 110-1 to 110-6 are provided is shown.

The avatar material provision system 110-1 generates a 3D face (head) material as an avatar material and provides the generated face material MT-1.

The avatar material provision system 110-2 generates a body material MT-2 as an avatar material and provides the generated body material MT-2. The body material MT-2 here becomes a part seen below the head of the human body. Also, the avatar material provision system 110-2 may generate the body material MT-2 wearing clothing.

The avatar material provision system 110-3 generates a voice material MT-3 as an avatar material and provides the generated voice material MT-3. The voice material MT-3 is a material of voice uttered by the avatar.

The avatar material provision system 110-4 generates an emotion material MT-4 as an avatar material and provides the generated emotion material MT-4. The emotion material MT-4 includes, for example, information for changing the expression of the face material, the motion of the body material MT-2, or the like in accordance with each prescribed emotion. The emotion material MT-4 enables the avatar to express the emotion.

The avatar material provision system 110-5 generates a movement material MT-4 as an avatar material and provides the generated movement material MT-5. The movement material. MT-S contains information for giving a motion to the avatar. For example, when the avatar is a weather forecaster who appears in weather forecast web content, motions corresponding to the weather forecaster such as, for example, pointing to a weather reap, can be given by the movement material MT-5 generated in correspondence with the weather forecaster.

The avatar material provision system 110-6 generates a space material MT-6 as an avatar material and provides the generated space material MT-6. The space material MT-6 is a material of a space where the avatar exists.

In the avatar generation system 100 shown in FIG. 3, the avatar material provision system 110-1 images the person PS who is the generation source and generates the face material MT-1 of the person PS. Also, the avatar material provision system 110-2 images the person PS who is the generation source and generates the body material MT-2 of the person PS. Also, the avatar material provision system 110-3 generates the voice material MT-3 using data obtained by recording the voice of the person PS who is the generation source.

The integration system 120 acquires the avatar materials (the face material MT-1, the body material MT-2, the voice material MT-3, the emotion material MT-4, the movement material MT-5, and the space material MT-6) generated by the avatar material provision systems 110-1 to 110-6. The integration system 120 integrates the acquired avatar materials to generate an, avatar AVT.

The avatar AVT may not use all the avatar materials (the face material, the body material, the voice material, the emotion material, the movement material, and the space material) illustrated in FIG. 3. That is, as the avatar AVT, an avatar, may be generated using, for example, some avatar materials among the avatar materials illustrated in FIG. 3. An avatar material to be used to generate the avatar may be changed in accordance with, for example, a network service in which the generated avatar is used.

Description will now return to FIG. 1. The avatar management device 200 manages an avatar generated by the avatar generation system 100.

The avatar management device 200 stores the avatar generated by the avatar generation system 100 as a management target. The avatar management device 200 uploads the stored avatar of the management target to the network service environment 300. The network service environment 300 provides an end user with the network service in which the avatar provided by the network service environment 300 is used.

Also, the avatar management device 200 determines the authenticity for an avatar of an inquiry target in accordance with an authenticity inquiry (an authenticity confirmation request) for the avatar used in the network service provided to the end user terminal 400 and transmits a determination result to the end user terminal 400.

The network service environment 300 is an environment that provides a network service in which an avatar to which authentication information is assigned by the avatar management device 200 is available. The network service environment 300 includes one or more service provision systems 310 that provide prescribed network services. The service provision system 310 may be configured, for example, as a web server or an application server constructed in accordance with the content of network services to be provided.

The network services provided by the service provision system 310 may be websites using avatars, network games, web conference systems, and the like. In these network services, for example, it is possible to provide a weather forecast using an avatar as a weather forecaster, a medical consultation service using an avatar as a doctor, and a fortune-telling service using an avatar as a fortune teller.

The end user terminal 400 is a terminal used by an end user to receive the network service provided from the service provision system 310 in the network service environment 300.

The end user terminal 400 is connected to the service provision system 310 in accordance with an operation of the end user, displays an application or content corresponding to the network service provided by the connected service provision system 310, and outputs the application or content by sound, and the like. Thereby, the end user can use applications such as, for example, web conferences, weather forecasts, and medical consultations as described above, or can view and listen to content, using the end user terminal 400.

An avatar used in the network service provided by the network service environment of the present embodiment is a real avatar generated by the avatar generation system 100. Since this real avatar is obtained by realistically reproducing the person of the generation source, the feeling of being in contact with the actual person who is the avatar generation source also becomes stronger, for example, from the perspective of the end user who uses the network service. Also, since the avatar is realistic, the occurrence of many unauthorized uses such as copying without permission and falsification by replacing a face material can be thought of.

With this as a background, a configuration in which it can be confirmed whether or not the avatar used in the network service is authentic is preferably adopted.

Therefore, in the present embodiment, when the end user has doubts about whether or not the avatar used in the network service is authentic, an authenticity inquiry (the transmission of an authenticity confirmation request) can be made by designating the avatar using the end user terminal 400 as is described below. The end user terminal 400 can perform an output process according to, for example, the display of a result of determining authenticity corresponding to the inquiry. The end user can confirm whether or not the target avatar is authentic based on the determination result output from the end user terminal 400.

The end user terminal 400 may be a personal computer, a smartphone, a tablet terminal, or the like.

Figure 4:
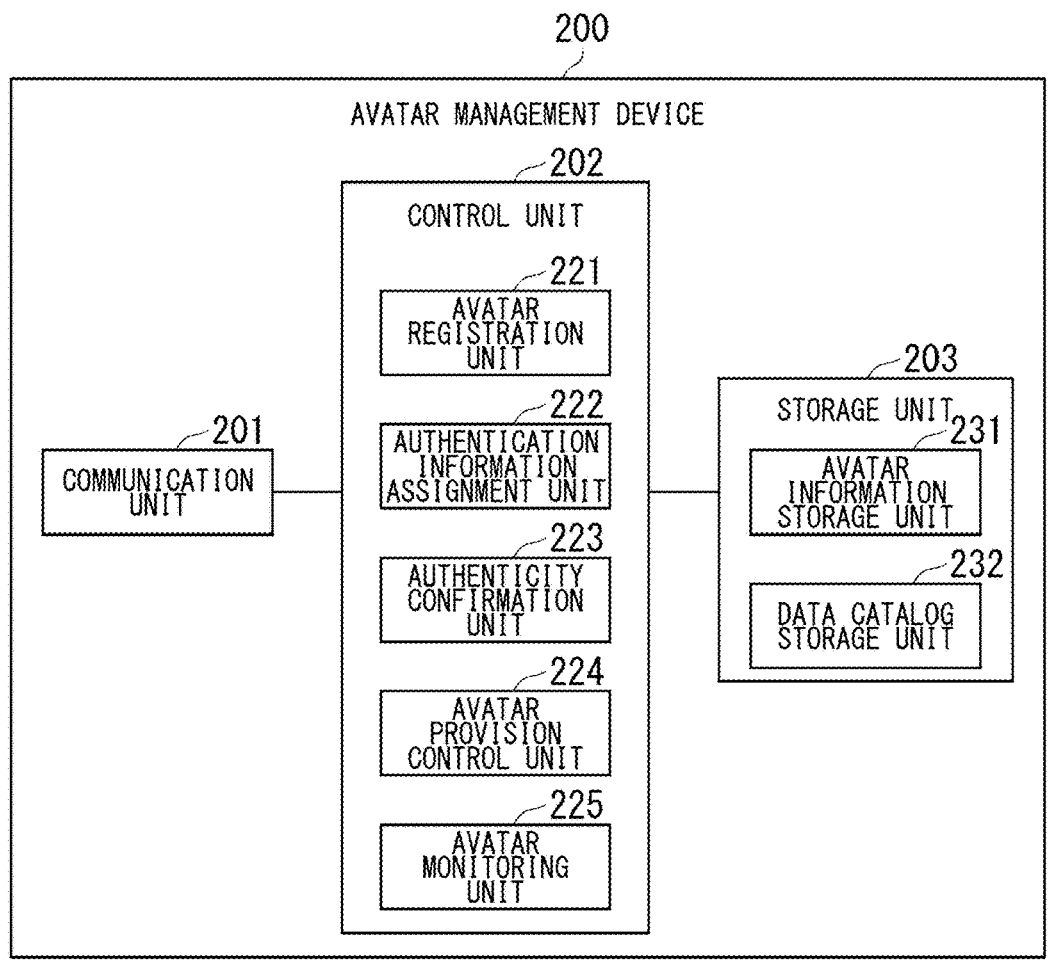
FIG. 4 is a diagram showing an example of a configuration of an avatar management device according to the present embodiment.

FIG. 4 shows an example of a configuration of the avatar management device 200. The functions of the avatar management device 200 shown in FIG. 4 are implemented by a central processing unit (CPU) of the avatar management device 200 executing a program.

The avatar management device 200 in FIG. 4 includes a communication unit 201, a control unit 202, and a storage unit 203.

The communication unit 201 communicates with the avatar generation system 100, the network service, environment 300, the end user terminal 400, and the like via the network.

The control unit 202 executes various types of control in the avatar management device 200. The control unit 202 in FIG. 2 includes an avatar registration unit 221, an authentication information assignment unit 222, an authenticity confirmation unit 223 and an avatar provision control unit 224. Also, since an avatar monitoring unit 225 corresponds to a third embodiment, description thereof is omitted here.

The avatar registration unit 221 registers an avatar generated by the avatar generation system 100 as a management target. Here, an avatar registration process is performed by having the avatar information storage unit 231 to store avatar information (to be described below) of the avatar of the management target.

The avatar registered by the avatar registration unit 221 can be used in a network service provided by the service provision system 310 itself in the network service environment 300.

The authentication information assignment unit 222 assigns authentication information to the registered avatar. The authentication information is described below.

In response to an authenticity confirmation request from the end user terminal 400, the authenticity confirmation unit 223 determines the authenticity of the avatar whose authenticity is to be confirmed, using the authentication information assigned to the registered avatar. The authenticity confirmation unit 223 transmits the authenticity determination result to the end user terminal 400 that is, a transmission source of the authenticity confirmation request.

The avatar provision control unit 224 controls the provision of the registered avatar (the transmission of avatar information) to the service provision system 310. The avatar management device 200 and each service provision system 310 may be connected by an API and the avatar provision control unit 224 may be configured to transmit avatar data to the service provision system 310 in an online connection state.

The storage unit 203 stores various types of information corresponding to the avatar management device 200. The storage unit 203 includes an avatar information storage unit 231. Since a data catalog storage unit 232 corresponds to a second embodiment, description thereof is omitted here.

The avatar information storage unit 231 stores avatar information.

Figure 5:
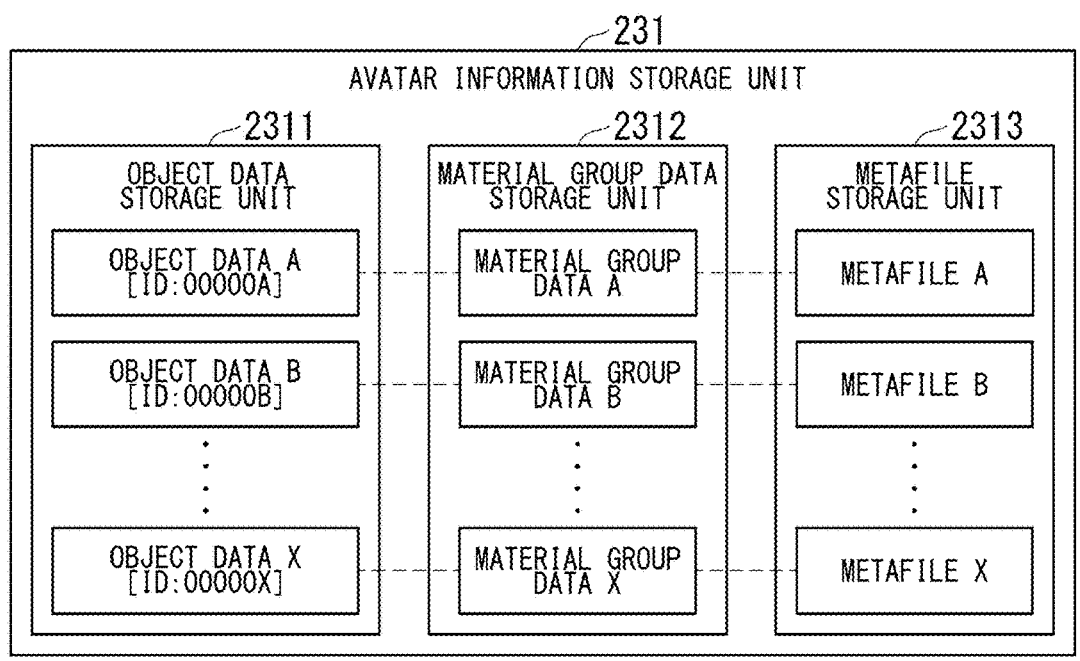
FIG. 5 is a diagram showing an example of avatar information stored in an avatar information storage unit according to the present embodiment.

FIG. 5 shows an example of avatar information stored in the avatar information storage unit 231. The avatar information storage unit 231 in FIG. 5 includes an object data storage unit 2311, a material group data storage unit 2312, and a'metafile storage unit 2313.

Avatar information corresponding to one avatar includes, for example, object data, material group data, and a metafile.

The object data storage unit 2311 stores object data for each registered avatar.

The material group data storage unit 2312 stores material group data for each registered avatar.

The metafile storage unit 2313 stores a metafile for each registered avatar.

Object data, material group data, and a metafile corresponding to the same avatar are associated with the same avatar ID between the object data storage unit 2311, the material group data storage unit 2312, and the metafile storage unit 2313.

Specifically, object data A, material group data A, and metafile A stored in the object data storage unit 2311, the material group data storage unit 2312, and the metafile storage unit 2313 in correspondence with avatar A are associated with an avatar ID [00000A] that uniquely indicates avatar A.

The object data is actual data of an object that is the corresponding avatar. The object data is formed, for example, by combining components such as the head and the body generated using prescribed avatar materials.

The material group data is data containing one or more avatar materials for adding a prescribed mode to the entity of the avatar based on the object data. The material group data may include, for example, the voice material, the emotion material, the movement material, the space material, and the like. According to the material group data, the object of the avatar can speak, change its facial expression, move, or exist inside of a virtual space with a prescribed design.

The metafile includes one or more pieces of metadata given to the corresponding avatar.

Figure 6:
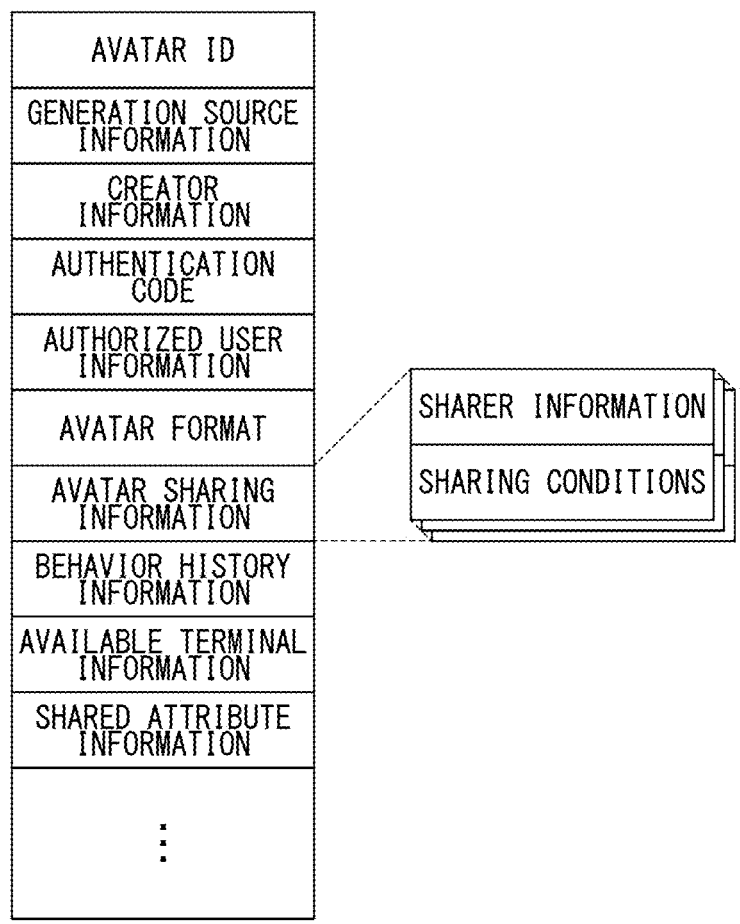
FIG. 6 is a diagram showing an example of a metafile according to the present embodiment.

FIG. 6 shows an example of a metafile corresponding to one avatar. The metafile shown in FIG. 6 includes metadata such as an avatar ID, generation source information, creator information, an authentication code, authorized user information, an avatar format, and avatar sharing information. Also, since behavior history information corresponds to the third embodiment, available terminal information corresponds to a seventh embodiment, and shared attribute information corresponds to an eighth embodiment, descriptions thereof is omitted here.

The avatar ID is an identifier uniquely indicating a corresponding avatar. The avatar ID may be issued when the avatar registration unit 221 registers the corresponding avatar. As described above, the avatar ID is associated with object data, material group data, and a metafile corresponding to the same avatar.

The generation source information is information about an original person (a generation source) of the corresponding avatar. The generation source information may include a generation source ID, profile information of a person who is the generation source, and the like as information items. The generation source information may be provided from the avatar generation system 100.

The creator information is information about a creator of the corresponding avatar. For example, in the avatar generation system 100, the creator may be an organization such as a company or an individual corresponding to the integration system 120 that has generated the corresponding avatar.

The authentication code is a code issued by the avatar management device 200 in association with an avatar of a provision target when the service provision system 310 receives the provision of the avatar (the transmission of avatar information) from the avatar management device 200.

The authorized user information is information about an authorized user. An authorized user is a person who has the authority to use the corresponding avatar. The authorized user may be the end user as a person who is the generation source of the avatar. In this case, the authorized user can have the avatar whose generation source is the user exist in a metaverse provided by the service provision system 310 and can have the avatar behave in the metaverse, for example, in accordance with an operation of the end user terminal 400. Also, the authorized user may be an operator of a specific service provision system 310 or the like. The authorized user information is information indicating such an authorized user, Specifically, the authorized user information may be a user account such as a user name and password registered by the authorized user.

The avatar format indicates an avatar file format as a format of the corresponding avatar, specifications, and the like.

In the present embodiment, for example, one avatar can be shared with a third party in accordance with the permission of the authorized user. The avatar sharing information is information about sharing of the corresponding avatar.

The avatar sharing information in FIG. 6 includes sharer information and sharing conditions. The sharer information is information of a sharer who is permitted to share the corresponding avatar with the authorized user. The sharer information may be, for example, a sharer's user account. The sharing conditions are conditions under which the sharer can share the corresponding avatar. The sharing, conditions may include, for example, an expiration date, information indicating a service provision system 310 that is designated such that the sharer can use the avatar, and the like.

The avatar management device 200 in FIG. 6 may include one device or may be implemented by assigning a prescribed function to each of a plurality of devices connected communicatively on a network, and then executing, a process in cooperation with the plurality of devices.

Figure 7:
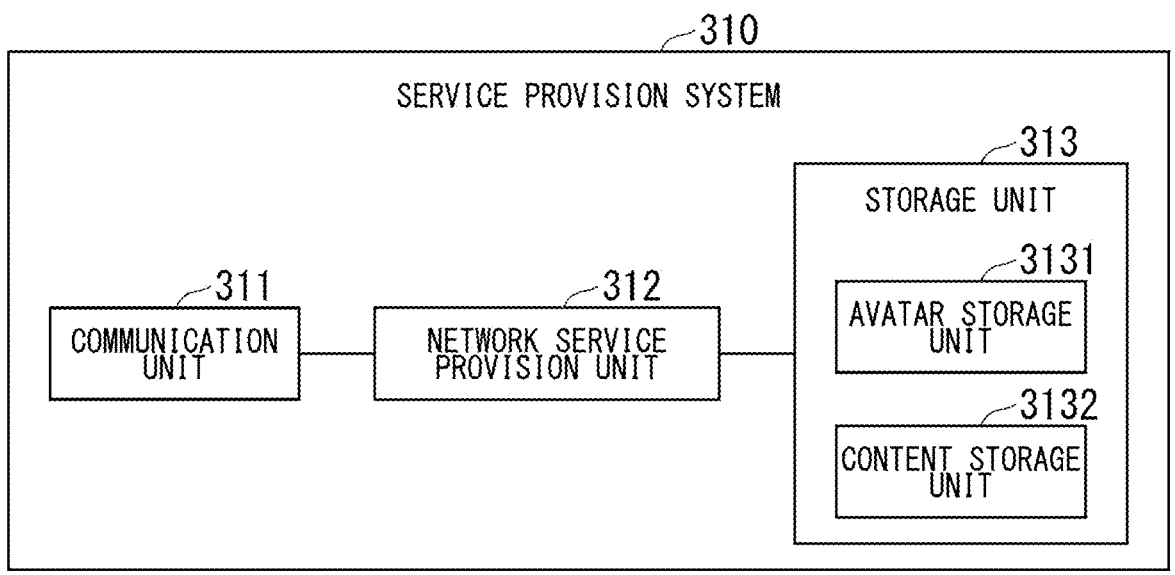
FIG. 7 is a diagram showing, an example of a configuration of a service provision system according to the present embodiment.

An example of a configuration of the service provision system 310 is described with reference to FIG. 7. The service provision system 310 in FIG. 7 includes a communication unit 311, a network service provision unit 312, and a storage unit 313.

The communication unit 311 communicates with the avatar management device 200 or the end user terminal 400 via the network.

The network service provision unit 312 executes a process for providing a network service to the end user terminal 400 via the communication unit 311. The network service provision unit 312 uses an avatar stored in the avatar storage unit 3131 when the network service is provided.

The storage unit 313 stores various types of information corresponding to the service provision system 310. The storage unit 313 includes an avatar storage unit 3131 and a content storage unit 3132.

The avatar storage unit 3131 stores avatar information of an avatar received from the avatar management device 200 for use in the network service. The avatar information stored in correspondence with one avatar by the avatar storage unit 3131 may include avatar information (object data, material group data, a metafile, and the like) of one avatar received from the avatar management device 200.

The content storage unit 3132 stores data of content provided by the service provision system 310 to an end user as a network service. The content, format, and the like stored in the content storage unit 3132 are not particularly limited. The content may be, for example, websites, videos, web applications, and the like. The web application may be, for example, one that enables two-way communication between the end user and the avatar using text or voice.

Figure 8:
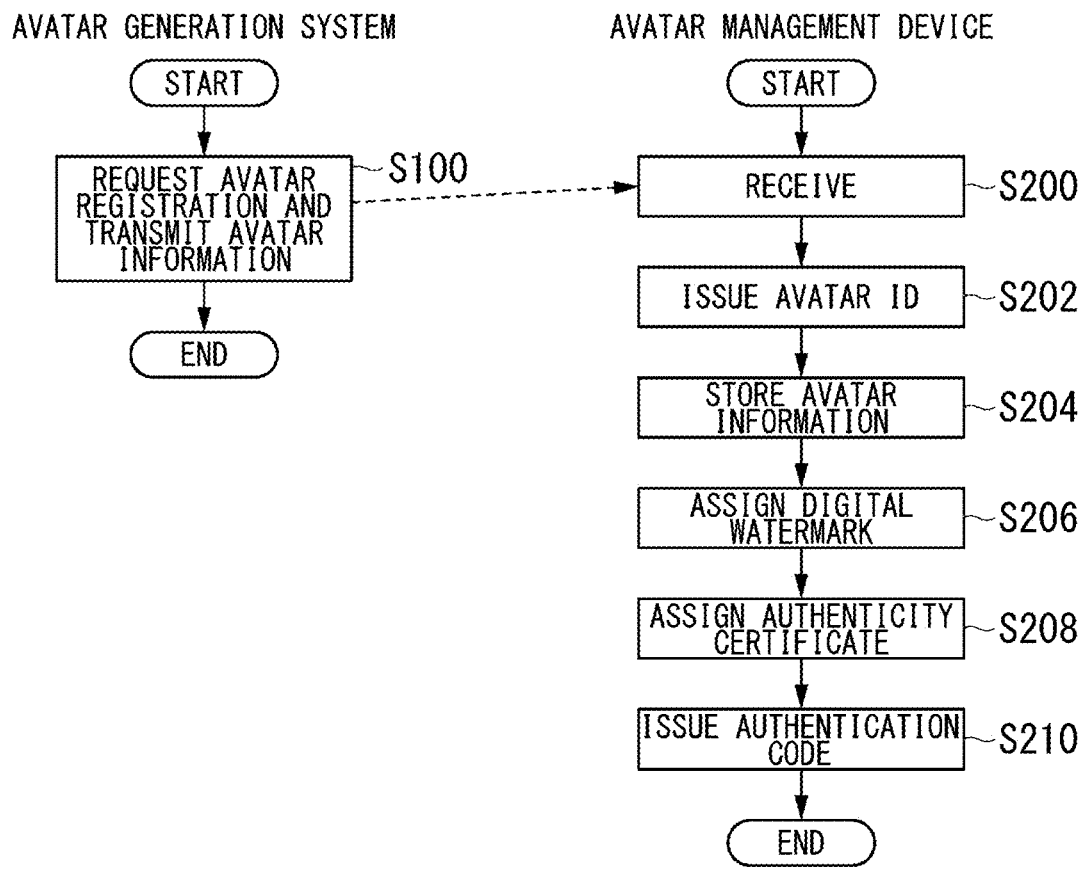
FIG. 8 is a flowchart showing an example of a processing procedure executed by the avatar generation system and the avatar management device in relation to avatar registration according to the present embodiment.

An example of a processing procedure executed by the avatar generation system 100 and the avatar management device 200 in relation to avatar registration is described with reference to the flowchart of FIG. 8.

First, an example of a processing procedure executed by the avatar generation system 100 is described.

Step S100: The integration system 120 in the avatar generation system 100 transmits a registration request for a generated avatar to the avatar management device 200. The avatar generation system 100 transmits avatar information (object data, material group data, and metadata) corresponding to the generated avatar together with the avatar registration request. The metadata in the avatar information transmitted by the integration system 120 is generation source information and creator information, for example, in correspondence with the metafile shown in FIG. 6.

Next, an example of a processing procedure executed by the avatar management device 200 is described.

Step S200: The avatar registration unit 221 in the avatar management device 200 receives an avatar registration request and avatar information transmitted from the integration system 120 in step S100.

Step S202: The avatar registration unit 221 issues an avatar ID associated with an avatar corresponding to the avatar information, received in step S100.

Step S204: The avatar registration unit 221 has the avatar information storage unit 231 store the avatar information received in step S100. At this time, the avatar registration unit 221 generates a metafile including metadata in the received avatar information and the avatar ID issued in step S202.

The avatar registration unit 221 associates object data and material group data in the received avatar information with the metafile generated as described above using the avatar ID issued in step S202. Subsequently, the avatar registration unit 221 has the object data storage unit 2311, the material group data storage unit 2312, and the metafile storage unit 2313 of the avatar information storage unit 231 respectively store the object data, the material group data, and the metafile associated with the avatar ID.

By storing the avatar information in the avatar information storage unit 231 in step S204 as described above, the avatar corresponding to the stored avatar information is registered. However, in the step in which the avatar information is stored in step S204, no authentication information is assigned to the corresponding avatar. Therefore, the authentication information assignment unit 222 of the avatar management device 200 performs a process of assigning a digital watermark (an example of authentication information) and a digital authenticity certificate (an example of authentication information) as a process of assigning the authentication information to a target that is an avatar registered in step S204 according to the following processing of steps S206 and S208.

Step S206: The authentication information assignment unit 222 assigns a digital watermark to the target avatar. For this reason, for example, the authentication information assignment unit 222 assigns information unique to the target avatar, such as an avatar ID, as the digital watermark to the object data of the target avatar. The digital watermark assigned to the object data of the avatar in this way is of an imperceptible type preferably, but may be of a perceptible type.

Step S208: The authentication information assignment unit 222 assigns a digital authenticity certificate to the target avatar. In this case, the authentication information assignment unit 222 may be configured to assign an authenticity certificate for certifying the creator of the target avatar, a storage location (URI) of the target avatar, the service provision system 310 that uses the target avatar, and the like to the target avatar.

The authenticity certificate may be configured so that an issuer issues an authenticity certificate for the target avatar, for example, when the authentication information assignment unit 222 executes a prescribed transaction with an issuer of the authenticity certificate in the network. This authenticity certificate may be managed on the network in association with, for example, the avatar ID of the target avatar (an example of information unique to the registration target avatar).

As an example, the authenticity certificate assigned to the avatar by the authentication information assignment unit 222 may be a non-fungible token (NFT) managed by, a blockchain. In this case, the authentication information assignment unit 222 may be configured to assign an authenticity certificate to the avatar using, for example, an external NFT platform. Also, the authentication information assignment unit 222 may be configured to assign an authenticity certificate generated using quantum-resistant cryptography or a quantum-resistant blockchain to the avatar.

Step S210: The authentication information assignment unit 222 issues a unique authentication code to a current registration target avatar. The authentication code is a code that is provided along with the avatar data of the target avatar to the service provision system 310 that provides a network service using the target avatar. The authentication code is used to determine the authenticity of the avatar corresponding to a request from the end user as is described below.

Since the authentication code is uniquely associated with the target avatar for example, the avatar II) issued in step S202 may be used.

However, for example, when the security for a process in which an avatar is identified or a process in which registration information that is likely to include a user's personal information is identified is strengthened, a code generated without relying on the avatar ID is preferably used as the authentication code.

The authentication information assignment unit 222 adds the issued authentication code as one piece of the metadata in the metafile stored in the metafile storage unit 2313 in association with the target avatar.

Also, after the assignment of authentication information to the registration target avatar and the issuance of an authentication code associated with the registration target avatar are performed in steps S206, S208, and S210, the registration target avatar may be stored in the avatar information storage unit 231 in step S204.

Also, a machine learning process may be, used in a process from avatar generation by the avatar generation system 100 to avatar registration in the avatar management device 200. As an example of the machine learning process, a trained model may be configured to apply components associated with an input emotion to the avatar in accordance with the input of the emotion to the avatar when an avatar is generated. Thereby, for example, an avatar that expresses a feeling of joy through the facial expression, the body motion, or the like can be generated by components combined in response to the input of "Generate a happy avatar." This trained model may be constructed by, for example, inputting a data set of an emotion and a component assigned to an avatar as learning data to a learning device and training the learning device.

Also, as an example of the machine learning process, when a component is registered, a category tag to be associated with a registration target component may be automatically generated or assigned based on results of automated recognition of facial expressions and voice as components and the like. Thereby, for example, when the facial expression component of a registration target expresses a smile, a tag "joy" is automatically assigned. A user involved in avatar generation easily searches for a component by assigning a tag to a component in this way. This trained model may be constructed by, for example, inputting a data set of a facial expression or a voice component and a tag as learning data to the learning device and training the learning device.

In this case, a machine learning process may be implemented by quantum computation.

Figure 9:
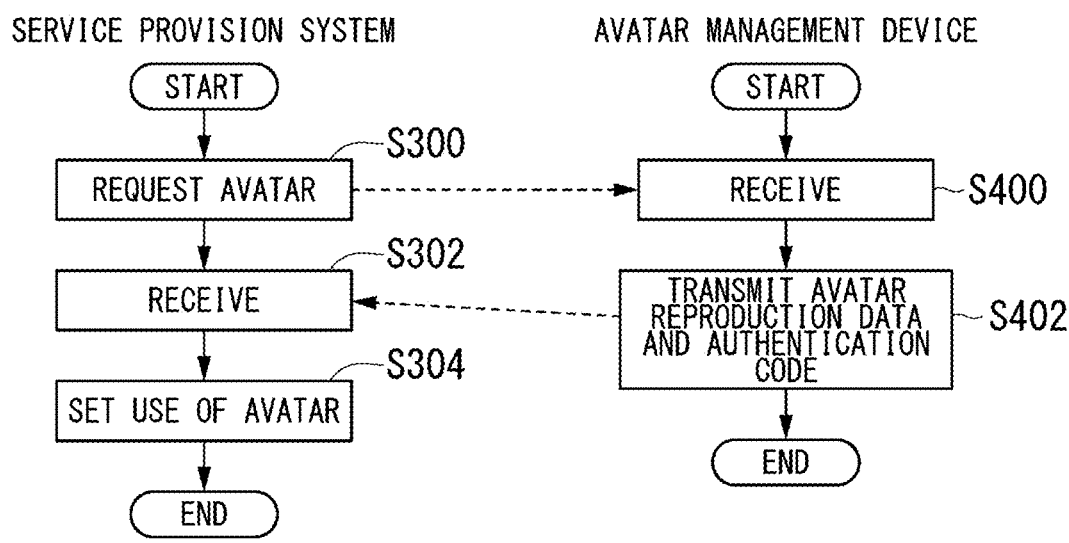
FIG. 9 is a flowchart showing an example of a processing procedure executed by the service provision system and the avatar management device in relation to the transmission and reception of avatar data according to the present embodiment.
}

An example of a processing procedure executed by the service provision system 310 and the avatar management device 200 in relation to the delivery and acceptance of an avatar is described with reference to the flowchart of FIG. 9.

First, an example of a processing procedure executed by the service provision system 310 is described.

Step S300: The network service provision unit 312 in the service provision system 310 transmits an avatar request to the avatar management device 200 at a prescribed timing when data of an avatar for use in a network service is acquired. The avatar request is used to designate an avatar for use in the network service by the service provision system 310 from among avatars registered in the avatar management device 200 and request (solicit) avatar information of the designated avatar.

Step S302: As a'response to the avatar request transmitted in step S300, the avatar management device 200 transmits avatar reproduction data and an authentication code corresponding to the avatar designated in the avatar request. Avatar reproduction data is information including object data and material group data within avatar information.

The network service provision unit 312 receives the avatar reproduction data and the authentication code transmitted by the avatar management device 200 as described above. Thus, the avatar information is transmitted from the avatar management device 200 to the service provision system 310.

Step S304: The network service provision unit 312 performs an avatar usage setting process so that the avatar received in step S302 is available in the network service.

As the avatar usage setting process, the network service provision unit 312 associates the avatar reproduction data and the authentication code, received in step S302 with each other and has the avatar storage unit 3131 store the avatar reproduction data and the authentication code. The network service provision unit 312 may create content to be provided as the network service using the avatar reproduction data stored in the avatar storage unit 3131 and have the content storage unit 3132 store the created content.

Next, an example of a processing procedure executed by the avatar management device 200 is described.

Step S400: The avatar provision control unit 224 in the avatar management device 200 receives an avatar request transmitted from the service provision system 310 in step S300.

Step S402: The avatar provision control unit 224 acquires avatar reproduction data (object data and material group data) and an authentication code of an avatar designated in the received avatar request from the avatar information storage unit 231 in accordance with the reception of the avatar request. The avatar provision control unit 224 transmits (uploads) the avatar reproduction data and the authentication code that have been acquired to the service provision system 310 that is a transmission source of the avatar request.

An example of a processing procedure executed by the end user terminal 400, the service provision system 310, and the avatar management device 200 of the present embodiment in relation to avatar authenticity confirmation is described with reference to a sequence diagram of FIG. 10.

Step S500: An end user receiving the provision of a certain network service using, the end us terminal 400 has doubts about whether or not the avatar used in the network service is fraudulent.

Examples of fraudulent avatars include avatars that have been falsified by replacing avatar materials such as face materials with fake materials different from the original, and avatars copied without the permission of those who have certain rights to avatars such as creators.

It is assumed that the end user confirms the authenticity of the avatar used in the above-described network service (authenticity confirmation). In this case, the user operates the end user terminal 400 such that an authentication code request is transmitted from the end user terminal 400 to the service provision system 310 that provides a network service using the avatar of an authenticity confirmation target.

The authentication code request includes information for identifying the avatar designated as the authenticity confirmation target. The information for identifying the avatar may be, for example, information for designating content of a network service in which the avatar of the authenticity confirmation target is used, a name assigned to the avatar of the authenticity confirmation target (an avatar name), or the like.

Step S502: The network service provision unit 312 in the service provision system 310 receives the authentication code request transmitted in step S500. The network service provision unit 312 acquires the authentication code associated with the avatar used in the content of the network service designated in the received authentication code request from the avatar storage unit 3131.

The network service provision unit 312 transmits the acquired authentication code to the end user terminal 400 that is a transmission source of the authentication code request.

Step S504: The end user terminal 400 receives the authentication code transmitted from the service provision system 310 in step S502. Although omitted in FIG. 10, the end user terminal 400 may display, for example, a notification indicating that an authentication code request is received in accordance with the transmission of the authentication code request.

When the authentication code is received, the end user terminal 400 transmits an authenticity confirmation request to the avatar management device 200. The authenticity confirmation request may include information (network service identification information) for identifying the network service (content) in which the avatar of the authenticity confirmation target is used and the authentication code received in step S502.

The authenticity confirmation unit 223 in the avatar management device 200 receives the authenticity confirmation request transmitted in step S504. In accordance with the reception of the authenticity confirmation request, the authenticity confirmation unit 223 executes an authenticity confirmation process for the avatar of the authenticity confirmation target in the following steps S506 to S510.

Step S506: The authenticity confirmation unit 223 retrieves avatar information of an avatar (an authentic avatar) registered to be authentic with respect to the avatar of the confirmation target from the avatar information stored in the avatar information storage unit 231. For this purpose, the authenticity confirmation unit 223 retrieves avatar information whose metafile includes the authentication code included in the received authenticity confirmation request from the avatar information stored in the avatar information storage unit 231.

When avatar information of a confirmation target avatar has not been retrieved in step S506, the avatar itself associated with the authentication code included in the received authenticity confirmation request is not registered in the avatar management device 200. That is, in this case, the authentication code itself included in the received authenticity confirmation request is fraudulent. In this case, the authenticity confirmation unit 223 can determine that the confirmation target avatar is fraudulent based on the fraudulent authentication code. In this case, since the authenticity confirmation unit 223 cannot acquire the avatar information of the confirmation target avatar, the following processing of steps S508 and S510 may be skipped.

Step S508: When the avatar information of the confirmation target avatar is retrieved in step S506, the authenticity confirmation unit 223 executes an authenticity confirmation process based on a digital watermark.

In this case, the authenticity confirmation unit 223 accesses a network service identified in network service identification information included in the received authenticity confirmation request and acquires an image of an object of the avatar for use in the accessed network service (i.e., the confirmation target avatar).

The authenticity confirmation unit 223 extracts a digital watermark from the acquired image of the object of the confirmation target avatar. The authenticity confirmation unit 223 also extracts the digital watermark from object data of an authentic avatar. The authenticity confirmation unit 223 compares the digital watermark extracted from the confirmation target avatar with the digital watermark extracted from the authentic avatar and determines whether or not the two digital watermarks match.

Step S510: Also, the authenticity confirmation unit 223 confirms the authenticity of the confirmation target avatar based on the authentication information as follows.

The authenticity confirmation unit 223 acquires an authenticity certificate associated with the avatar ID of the avatar information of the authentic avatar searched in step S506 from an authenticity certificate issuer on the network and refers to content of the acquired authenticity certificate.

For example, information indicating the storage location of the authentic avatar and the network service using the authentic avatar may be described in the authenticity certificate. In this case, the authenticity confirmation unit 223 performs a comparison process of whether or not information (comparison target information) of the network service where the confirmation target avatar is used and the storage location of the authentic avatar or the like, match the description of the authenticity certificate.

In the processing of steps S506 to S510, the authenticity confirmation unit 223 can obtain the result of authenticity confirmation for the confirmation target avatar as follows.

When the avatar information corresponding to the authentic avatar cannot be retrieved in step S506, the authenticity confirmation unit 223 can obtain an authenticity confirmation result indicating that the confirmation target avatar is fraudulent since the authentication code itself associated with the confirmation target avatar is false as described above.

A fraudulent form where the authentication code is false corresponds to, for example, a case where the confirmation target avatar was not created by an authentic creator and was not capable of being associated with the authentic authentication code.

Also, when it is determined that the digital watermark of the confirmation target avatar does not match the digital watermark of the authentic avatar in step S508, the authenticity confirmation unit 223 can obtain the authenticity confirmation result indicating that the confirmation target avatar is fraudulent since the digital watermarks do not match.

A fraudulent form when the digital watermarks do not match in this way corresponds to, for example, a case where the confirmation target avatar is generated by replacing or partially rewriting a face material, a body material, or the like to falsify an authentic avatar.

Also, when it is determined that content of comparison target information does not match the authenticity certificate in step S510, the authenticity confirmation unit 223 can obtain an authenticity confirmation result indicating that the confirmation target avatar is fraudulent since no authenticity certificate is assigned.

In this case, a fraudulent form corresponds to a case where a generator of the confirmation target avatar is not an authentic person, a case where the use of a corresponding authentic avatar is not permitted in a network service in which the confirmation target avatar is used, or the like.

On the other hand, when it is determined that the digital watermark of the confirmation target avatar matches the digital watermark of the authentic avatar in step S508 and it is determined that the content of the comparison target information matches the authenticity certificate in step S510, the authenticity confirmation unit 223 can obtain an authenticity confirmation result indicating that the confirmation target avatar is an authorized avatar and is authentic.

Step S512: The authenticity confirmation unit 223 transmits information (authentication confirmation result information) indicating the authenticity confirmation result obtained in the processing of steps S506 to S510 to the end user terminal 400 that is a transmission source of the authenticity confirmation request.

For the authenticity confirmation result information, information such as the avatar ID of the confirmation target avatar, information about a creator, and information about a person who is a generation source may be included. Also, when the authenticity confirmation result indicates that fraudulent information is obtained, the authenticity confirmation result information may include information that describes the reason why it is determined to be fraudulent.

Step S514: The end user terminal 400 receives the authenticity confirmation result information transmitted from the avatar management device 200 in step S312. The end user terminal 400 outputs the received authenticity confirmation result information in a prescribed mode.

The end user terminal 400 may be configured to display, for example, the authenticity confirmation result information by text or the like. In this case, as the confirmation result related to the authenticity, information indicating whether or not the confirmation target avatar is authentic, a reason for a fraudulent case, an avatar ID, of a confirmation target, information of a creator, and the like may be displayed by text or the like.

Figure 10:
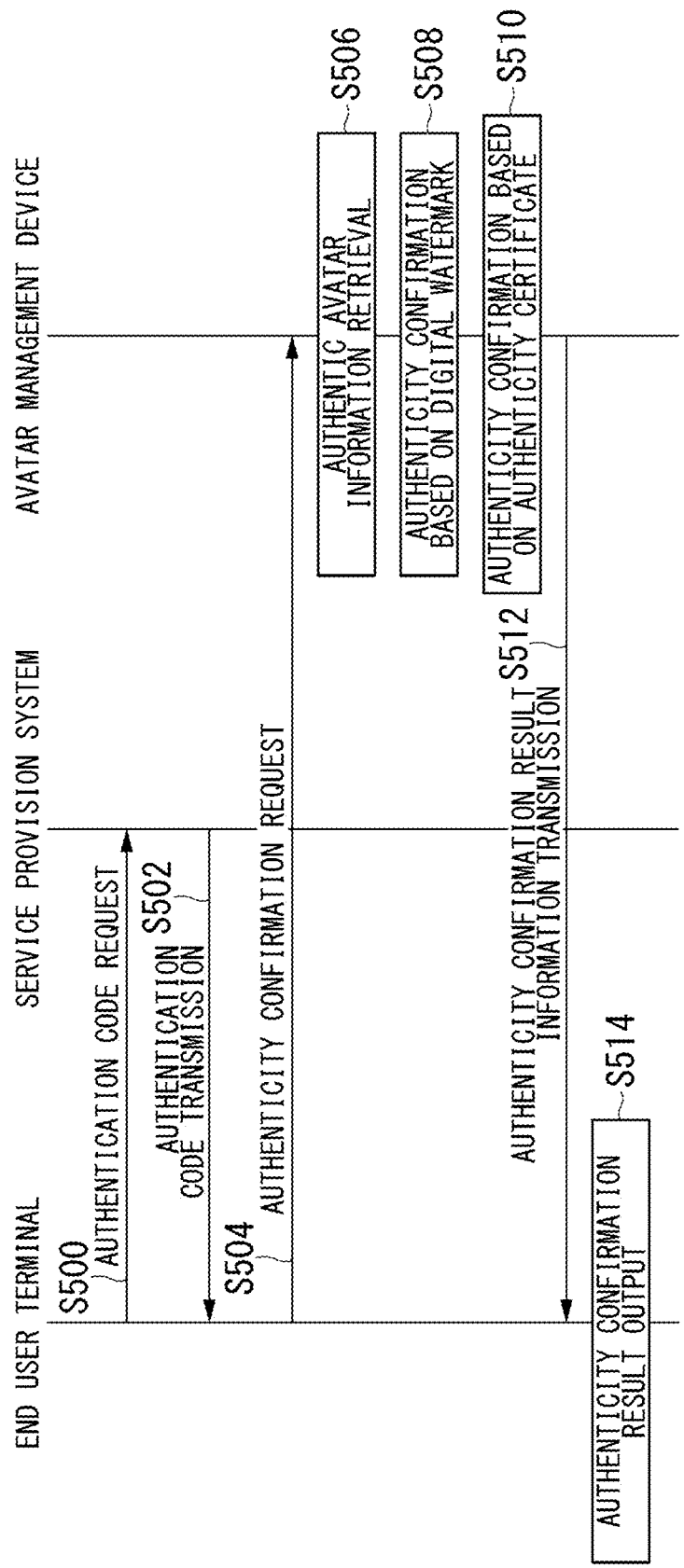
FIG. 10 is a flowchart showing an example of a processing procedure executed by an end user terminal, the service provision system, and the avatar management device in relation to authenticity confirmation of the avatar according to the present embodiment.

Also, the end user terminal 400 may be enabled to execute a process of FIG. 10 using, for example a chatbot application.

Specifically, the end user inputs, for example, text such as "I want to confirm the authenticity of the avatar of the network service named OO" to the chatbot application operating on, the end user terminal 400. In accordance with the input of such text, the end user terminal 400 transmits an authentication code request in step S500.

In accordance with the reception of the authentication code in step S502, the chatbot application displays a message based on text such as "The authentication code is

[XXXXXX]. Do you want to confirm the authenticity with this authentication code?". Therefore, the end user inputs command text for confirming, the authenticity such as "Confirm authenticity" to the chatbot application. In accordance with the input of such text, the end user terminal 400 transmits an authenticity confirmation request to the avatar management device 200 in step S504.

In accordance with the transmission of the authenticity confirmation request, the avatar management device 200 executes the processing; of steps S506 to S510 to confirm the authenticity of the confirmation target avatar and transmit the authenticity confirmation result to the end user terminal 400 in step S512.

The chatbot application displays a received authenticity confirmation result information message. For example, as a message of authenticity confirmation result information confirmed to be authentic, for example, text such as "The avatar desired to be confirmed is determined to be authentic. The avatar ID of this avatar is [00000A], the creator is "OOOO," and the generation source is "OOOO" may be displayed.

Also, instead of the chatbot application, the end user terminal 400 may be configured to perform authenticity confirmation in the following mode.

In a metaverse space where avatars exist (hereafter simply referred to as a metaverse), personal identification confirmation (authenticity confirmation) can be performed at the entrance of a specific location. Specifically, an entrance to a specific place is provided in the metaverse, and at the entrance, a reception avatar requests an authenticity confirmation target avatar desiring to pass through the entrance to present a personal identification card. When the authenticity confirmation target avatar presents the personal identification card in response to the request for the presentation of the personal identification card, the avatar management device 200 performs an authenticity confirmation process, for example, according to the processing of steps S506 to S510. In this case, if the confirmation result indicating, that the authenticity confirmation target avatar is authentic is obtained, the reception avatar in the metaverse permits the authenticity confirmation target avatar to pass through the entrance.

Second Embodiment

Next, a second embodiment is described. An avatar management system of the present embodiment includes a data catalog of avatars stored and registered in an avatar information storage unit 231. A storage unit 203 in an avatar management device 200 of the present embodiment further includes the data catalog storage unit 232 (FIG. 4).

The data catalog stores catalog information that, functions as a catalog of registered avatars, FIG. 11 shows an example of a data catalog of the present embodiment. As shown in FIG. 11, catalog information corresponding to one avatar in the data catalog includes for example, an avatar ID, authorized user information, an avatar format, a corresponding metaverse format, use destination designation information, and the like. In the catalog information of FIG. 11, information acquired from a metafile with the same avatar ID may be used as information that is the same as that contained in the metafile (FIG. 6).

In the catalog information, the avatar ID is an identifier for identifying a corresponding avatar.

Authorized user information is information indicating an authorized user who has the authority to use the corresponding avatar. As the authorized user information in the data catalog, the authorized user information stored in the metafile of the corresponding avatar may be used.

Also, when a sharer is set for the corresponding avatar, avatar sharing information indicating content of the setting of the sharer may also be included in the authorized user information for the data catalog.

The avatar format is a corresponding avatar format (a file format and a specification format).

The corresponding metaverse format is information of a metaverse format with which the corresponding avatar is compatible.

Use destination designation information is information indicating the metaverse in which the corresponding avatar is available or the metaverse in which use is prohibited, as designated by the authorized user. An authorized user for the avatar can designate a metaverse in which an avatar whose use is authorized is used at his/her own discretion. Also, the authorized user for the avatar can designate a metaverse in which the use of the avatar is prohibited. That is, the user has the authority to control whether or not to provide personal information for each service. The use destination designation information indicates whether or not personal information is available for each metaverse (i.e., the service provision system 310) designated by the user in accordance with such authority.

In the present embodiment, metaverses are provided as a plurality of service provision systems 310 in the network service environment.

In the present embodiment, the registered avatar may be, for example, a real avatar obtained by projecting the user himself/herself. Users can make their avatars exist and behave in the metaverse.

In the avatar management device 200, the avatar provision control unit 224 performs a matching process between the target avatars stored in the data catalog and the metaverse (the service provision system 310) when the avatars exist in the metaverse. As a matching process, for example, with reference to the avatar format and the metaverse format corresponding thereto in the catalog information, the avatar provision control unit 224 identifies a metaverse of a metaverse format available in the avatar format of the target avatar as it is. At this time, the avatar provision control unit 224 may have an end user terminal 400 display a list of available metaverses. The end user can perform an operation of designating a metaverse in which the avatar exists from the displayed list.

The avatar provision control unit 224 can have the avatar exist in the metaverse by transmitting the avatar to the service provision system 310 of the metaverse, for example, via an API (Application Programming Interface). The metaverse where the avatar exists may be designated by, for example, an end user acting as an authorized user by operating the end user terminal 400.

Also, when the avatar exists in the metaverse whose metaverse format does not match the avatar format of the target avatar, the avatar provision, control unit 224 may convert the avatar format of the target avatar into the metaverse format of the metaverse of the use destination. The avatar provision control unit 224 can transmit the target avatar based on the avatar format after conversion to the metaverse of the use destination and have the target avatar exist therein.

Third Embodiment

In the present embodiment, for example, metadata of avatar information may include behavior history information (FIG. 6).

An avatar provision control unit 224 (or an avatar monitoring unit 225) in an avatar management device 200 monitors behavior in a metaverse of a service provision system 310 for each avatar whose avatar information is stored (registered) in an avatar information storage unit 231 and stores behavior history information indicating a history of the monitored behavior in the avatar information metadata of the corresponding avatar.

Fourth Embodiment

Next, a fourth embodiment is described. An avatar management device 200 of the present embodiment includes an avatar monitoring unit 225 (FIG. 4).

The avatar monitoring unit 225 monitors behavior of an avatar existing in a service provision system 310 in a network service environment 300. The avatar monitoring unit 225 may monitor the avatar's behavior with reference to the avatar's behavior history saved for each service provision system 310. As for avatars whose avatar information is stored (registered) in an avatar information storage unit 231, the behavior may be monitored based on behavior history information in the third embodiment.

The avatars to be monitored by the avatar monitoring unit 225 may include an avatar not registered in the avatar information storage unit 231 as well as an avatar whose avatar information is stored (registered) in the avatar information storage unit 231.

The avatar monitoring unit 225 may detect whether or not the avatar has performed fraudulent behavior in the metaverse as an avatar monitoring process. Fraudulent behavior may be predefined. For example, the fraudulent behavior may include violation of a rule defined in the metaverse, fraudulent behavior in the metaverse, violent behavior in the metaverse, and the like.

When the avatar monitoring unit 225 has detected fraudulent behavior of the avatar, the authenticity confirmation unit 223 may execute an authenticity confirmation process using an avatar whose fraudulent behavior is detected as a target.

Furthermore, in accordance with the detection of fraudulent behavior of the avatar, the avatar monitoring unit 225 may provide information about currently detected fraudulent behavior to the service provision system 310 having provided the metaverse in which the fraudulent behavior has occurred and the service provision system 310 of another metaverse, By providing information in this way, it is possible to crack down on an avatar detected this time to prevent the avatar from performing fraudulent behavior in some metaverse in the future.

Fifth Embodiment

Next, a fifth embodiment is described. An avatar in the present embodiment is a 3D real avatar. Thus, for example, it is possible to easily create a certain avatar as a real figure using a 3D printer or the like and sell the figure in the real world. In creating and selling avatar figures in the real world like this, according to rights such as copyrights and sales rights, only those who are duly authorized to create and sell the avatar figures and the like are required to be able to create and sell the avatar figures.

Therefore, the avatar management device 200 of the present embodiment adds, for example, 3D compatible watermark data, to object data of an avatar when avatar information of the avatar for use in printing is provided to a person having the authorization to create a figure.

The 3D compatible watermark data is data that is not visible in the metaverse, but is, added to the object data so that a mark such as a background pattern or color pattern appears at a prescribed position on the figure created by the 3D punter. Also, a position where the mark appears is preferably an inconspicuous position such as the sole of a foot.

Thereby, for example, when a figure is created with a 3D printer using avatar information obtained without going through an authorized acquisition route, 3D compatible watermark data is not included in avatar information of a creation source. In this case, no mark will appear on the created figure.

Alternatively, in contrast to the above, the 3D compatible watermark data may be set so that a mark appears at a prescribed position on a figure when the figure is created with a 3D printer using avatar information obtained without going through an authorized acquisition route. In this case, the position where the mark appears may be, for example, a conspicuous position such as a face.

In this case, for example, in an avatar information metafile for each avatar, whether or not to assign 3D compatible watermark data may be designated. Also, a valid 3D printer capable of creating (printing) a corresponding avatar figure may be registered in the metafile. Subsequently, the authorized 3D printer can obtain avatar information from which the 3D compatible watermark data is removed by the avatar management device 200 through an authorized route and create a figure by accessing the avatar management device 200 and obtaining authentication. No mark appears on a figure created in this way.

On the other hand, an unauthorized 3D printer cannot access the avatar management device 200 and obtain authentication. In this case, the unauthorized 3D printer creates a figure using avatar information that is obtained without going through an authorized acquisition route. Since the 3D compatible watermark data has not been removed from the avatar information fraudulently obtained in this way, a mark appears on the created figure, which serves as evidence that the figure is not an authentic figure.

In this way, in the present embodiment, it is possible to determine whether or not a figure existing in the real world is authentic according to whether or not a prescribed mark appears. Thereby, it is possible to prevent figures created from fraudulent avatar information from being distributed in the real world.

In the present embodiment, a person authorized to create figures may be defined based on avatar sharing information (FIG. 6) in metadata of avatar information. In this case, a sharing condition in corresponding avatar sharing information may indicate that the creation of avatar figures is permitted.

Sixth Embodiment

Next, a sixth embodiment is described.

Metadata in avatar information includes authorized user information (FIG. 6). In the present embodiment, the authorized user information is a user account of the user. In this way, when the authorized user information is the user account, the avatar and the user account are associated with each other.

In the present embodiment, if avatars that the user has the authority to use are being used fraudulently, the user can make a request in relation to fraudulent use. The avatars that the user has the authority to use are not limited to, for example, avatars that use the user as a material, and may include avatars that do not use the user as a material but whose use is authorized.

For example, a user having the authority to use finds out that their avatar is duplicated (or stolen) and used fraudulently in a certain service provision system 310. In this case, for example, the user has their end user terminal 400 to access an avatar management device 200, and logs in to a request-related site where an avatar is used fraudulently with their user account. The user makes a request for their avatar which is being used fraudulently on the request-related site to which he or she has logged in. When the request is made, the user inputs, for example, an avatar ID of an authentic avatar that is a source of the avatar being used fraudulently and the location of a service provision system 310 being used fraudulently (for example, a Uniform Resource Locator (URL)).

In accordance with the reception of the request related to the fraudulent use, a control unit 202 of the avatar management device 200 can perform a control process for prohibiting the fraudulent use of the avatar with respect to the service provision system 310 in which the avatar is being used, fraudulently. At this time, the control unit 202 identifies a fraudulently used avatar, for example, by collating object data of avatar information associated with an avatar ID input in the request related to the fraudulent use and an, avatar existing in the service provision system 310 input in the request related to the fraudulent use. The control unit 202 may instruct the service provision system 310 to prohibit the use of the identified avatar.

Seventh Embodiment

Next, a seventh embodiment is described. In the present embodiment, terminals (devices) that can use one registered avatar are limited. The maximum number of terminals that can use the avatar may be predetermined. Also, the maximum number of terminals that can use the avatar may differ according to, for example, a rank assigned to a user, an amount of avatar usage fee paid by the user, and the like.

Metadata in the avatar information of the present embodiment includes available terminal information (FIG. 6). The available terminal information indicates terminal IDs of one or more terminals registered by a user who has the authority to use within a predetermined maximum number range.

The user accesses a service provision system 310 with their own end user terminal 400 and performs an operation for having their avatar to exist in a metaverse of the accessed service provision system 310. In accordance with this operation, the service provision system 310 transmits an avatar request to an avatar management device 200. The avatar request includes an avatar ID of a target avatar and, a terminal ID indicating the end user terminal 400 of an access source.

An avatar provision control unit 224 in the avatar management device 200 retrieves metadata of avatar information storing an avatar ID that is the same as that included in the received avatar request from the avatar information storage unit 231. The avatar provision control unit 224 determines whether or not a terminal ID that is the same as that included in the received avatar request is stored in available terminal information of the retrieved metadata.

When the same terminal ID is stored, the end user terminal 400 that is the access source can use the avatar. In this case, the avatar provision control unit 224 transmits avatar information, to the service provision system 310. Thereby, the user can use the avatar in the metaverse displayed on the end user terminal 400.

On the other hand, when the same terminal ID is not stored, the end user terminal 400 that is the access source cannot use the avatar. In this case, the avatar provision control unit 224 returns, for example, an error, to the service provision system 310. In this case, the user cannot use the avatar in the metaverse displayed on the end user terminal 400.

Eighth Embodiment

Next, an eighth embodiment is described. In the present embodiment, effects and items acquired by avatars in a certain metaverse are shared attributes and the shared attributes are also made available to avatars in other metaverses.

Metadata of avatar information in the present embodiment includes shared attribute information (FIG. 6). The shared attribute information is information storing shared, attributes capable of being shared by avatars between metaverses. That is, the shared attribute information stores, for example, data such as effects and items acquired by avatars in a certain metaverse as shared attributes of avatars.

Also, the avatar management system in the present embodiment may convert articles such as clothing and accessories purchased in the real world by a user who is an authorized user into data such as effects and items and include the data in the shared attribute information as shared attributes.

In this case, as an example, one of avatar material provision systems 110 in an avatar generation system 100 may be configured to digitize an article purchased by the user in the real world and provide avatar materials as shared attributes. This avatar material provision system 110 may acquire information of a product code included in payment information, for example, when the user purchases an article, and generate data of effects and items corresponding to an identified product based on the acquired product code. The data generated in this way is passed to the avatar management device 200 and stored as a shared attribute in the shared attribute information.

Effects and items as shared attributes stored in the shared attribute information are not limited to a metaverse of a provision source and are defined as being, available in other metaverses.

The avatar provision control unit 224 of the avatar management device 200 assigns a shared attribute included in the shared attribute information to the avatar when the avatar exists in metaverse A. Also, when the same avatar exists in metaverse B different from metaverse A, the avatar provision control unit 224 can assign the shared attribute included in the same shared attribute information to the avatar. In this way, avatars can exist with the same attributes across different metaverses.

Here, if the shared attribute is, for example, members of a family, the spouse or child can be included in shared attribute information as the shared attribute when the avatar gets married or has a child in a certain metaverse. As a result, avatars can exist with spouses and children in other metaverses thereafter. Furthermore, something like a family tree available in the metaverse can be provided based on such shared attribute information.

Also, the above-described processes of the avatar generation system 100, the avatar management device 200, the service provision system 310, the end user terminal 400, and the like may be performed by recording a program for implementing the above-described functions of the avatar generation system 100, the avatar management device 200, the service provision system 310, the end user terminal 400, and the like on a computer-readable recording medium and having a computer system to read and execute the program recorded on the recording medium. Here, "having the computer system to read and execute the program recorded on the recording medium" includes installing the program on the computer system. The "computer system" used here is assumed to include an operating system (OS) and hardware such as peripheral devices. Also, the "computer system" may include a plurality of computer devices connected via a network, including the Internet, a wide area network (WAN), a local area network (LAN), and a communication circuit such as a dedicated circuit. Also, the "computer-readable storage medium" refers to a storage device such as a flexible disc, a magneto-optical disc, a read-only memory (ROM), a portable medium such as a compact disc-ROM (CD-ROM), and a hard disk embedded in the computer system. Thus, the recording medium storing the program may be a non-transitory recording medium such as a CD-ROM. The recording medium also includes a recording medium provided internally or externally that can be accessed from a distribution server for distributing the program. A code of a program stored in the recording medium of the distribution server may be different from a code of a program in a format that can be executed in a terminal device. That is, as long as a program can be downloaded from the distribution server and installed in a format that the program can be executed by the terminal device, a format in which the program is stored in the distribution server does not matter. Also, a configuration in which a program is divided into a plurality of parts and the parts are downloaded at different timings and then coalesced by the terminal device or the distribution server that distributes parts of the divided program may be different. Furthermore, a "computer-readable recording medium" is assumed to include a medium for retaining a program for a given period of time such as a volatile memory (RAM) inside of a computer system that serves as a server or client when the program is transmitted via a network. Also, the above-described program may be a program for implementing some of the above-described functions. Further, the above-described program may be a program capable of implementing the above-described function in combination with a program already recorded on the computer system, i.e., a so-called differential file (differential program).

What is claimed is:

1. An avatar management system for authenticating avatars, comprising:
a hardware processor configured to:
register, using an avatar registration unit, an available avatar by having a storage unit to store the available avatar used in a network service provided to an end user on a network;
assign, using an authentication information assignment unit, authentication information indicating authenticity of the registered avatar to a registration target avatar registered in the avatar registration unit, and
authenticate, using an authenticity confirmation unit, a designated avatar by confirming authenticity of the designated avatar according to an assignment condition of the authentication information to the designated avatar, in accordance with an authenticity confirmation inquiry made by designating the avatar used in the network service, wherein:
the authentication information is an authenticity certificate assigned to the registered avatar, that is associated with information unique to the registration target avatar.

2. The avatar management system according to claim 1, wherein the authenticity certificate is an authenticity certificate that an issuer issues for the registration target avatar when the authentication information assignment unit executes a prescribed transaction in the network.

3. The avatar management system according to claim 1, wherein the authenticity certificate is a non-fungible token (NFT) managed by a blockchain.

4. The avatar management system according to claim 1, wherein the authentication information assignment unit assigns a plurality of different pieces of authentication information to the registration target avatar.

5. The avatar management system according to claim 1, wherein the authentication information is a digital watermark embedded in data of an object of the registration target avatar.

6. The avatar management system according to claim 1, further comprising:
a data catalog storage unit configured to store a data catalog including catalog information according to prescribed metadata for each avatar registered by the avatar registration unit and to which authentication information is assigned by the authentication information assignment unit; and
an avatar provision control unit configured to identify a network service in which an avatar is available from among network services according to the catalog information in the data catalog and provide the avatar to the identified network service.

7. The avatar management system according to claim 1, wherein:
the avatar registration unit has the storage unit to store authorized operator information indicating an authorized operator who has the authority to operate the registered avatar and operation authority sharer information about an operation authority sharer who is authorized to share the authority to operate the registered avatar with the authorized operator.

8. The avatar management system according to claim 1, wherein:
the authenticity confirmation unit determines the authenticity of the designated avatar according to whether or not the description in the authenticity certificate and information to be compared that is assigned to the designated avatar match.

9. The avatar management system according to claim 1, wherein:
the authenticity confirmation unit determines the authenticity of the designated avatar according to:
authentication information assigned to the designated avatar used in the network service, and
the authentication information assigned to the designated avatar to be registered, which is stored by the storage unit.

10. The avatar management system according to claim 1, wherein the authentication information assignment unit issues a unique authentication code to the registration target avatar, in which the authentication code is used to determine the authenticity of the avatar corresponding to a request from the end user.

11. The avatar management system according to claim 10, wherein:

an authenticity confirmation unit that authenticates a designated avatar by confirming, using the authenticity confirmation unit, authenticity of the designated avatar, according to an assignment condition of the authentication information to the designated avatar, in accordance with an authenticity confirmation inquiry made by designating the avatar used in the network service, the authenticity confirmation unit receives an authenticity confirmation request made by designating the avatar used in the network service, and the authenticity confirmation request includes the authentication code.

12. The avatar management system according to claim 11, wherein the authenticity confirmation unit retrieves avatar information of an avatar registered to be authentic with respect to the avatar of the confirmation target using the authentication code.

13. The avatar management system according to claim 12, wherein the authentication code is generated without relying on an avatar ID that includes registration information being capable of identifying a personal information of an avatar's generation source.

14. The avatar management system according to claim 1, wherein:

the authenticity confirmation unit is configured to confirm authenticity of the designated avatar whether or not material constituting the designated avatar used in the network service is fraudulent.

15. An avatar management method for use in an avatar management system, the avatar management method, comprising:

an avatar registration step of registering an available avatar by having a storage unit to store the available avatar used in a network service provided to an end user on a network;

an authentication information assignment step of assigning authentication information indicating authenticity of the registered avatar to a registration target avatar in the avatar registration step, and an authenticate confirmation step of confirming a designated avatar by confirming authenticity of the designated avatar according to an assignment condition of the authentication information to the designated avatar, in accordance with an authenticity confirmation inquiry made by designating the avatar used in the network service, wherein:

the authentication information is an authenticity certificate assigned to the registered avatar, that is associated with information unique to the registration target avatar.

16. A computer-readable non-transitory recording medium including a program for having a computer in an avatar management device to function as:

an avatar registration unit, registering an available avatar by having a storage unit to store the available avatar used in a network service provided to an end user on a network;

an authentication information assignment unit assigning authentication information indicating authenticity of the registered avatar to a registration target avatar in the avatar registration unit, and an authenticity confirmation unit confirming a designated avatar by confirming authenticity of the designated avatar according to an assignment condition of the authentication information to the designated avatar, in accordance with an authenticity confirmation inquiry made by designating the avatar used in the network service, wherein:

the authentication information is an authenticity certificate assigned to the registered avatar, that is associated with information unique to the registration target avatar.

* * * * *